UNITED STATES PATENT OFFICE.

EDGAR EVERHART, OF ATLANTA, GEORGIA.

PROCESS OF PURIFYING BAUXITE.

1,397,414.   Specification of Letters Patent.   Patented Nov. 15, 1921.

No Drawing.   Application filed February 9, 1920. Serial No. 357,409.

*To all whom it may concern:*

Be it known that I, EDGAR EVERHART, a citizen of the United States, residing at Atlanta, in the county of Fulton and State of Georgia, have invented certain new and useful Improvements in Processes of Purifying Bauxite; and I do hereby declare the following to be a full, clear, and exact description of the invention, such as will enable others skilled in the art to which it appertains to make and use the same.

My present invention relates to the separation of clay or clay-like substances from low grade bauxite, in order to purify the latter sufficiently so that it may be used in the industries, and so that it will pay for shipment for moderate distances. In certain localities there are considerable deposits of a low grade bauxite ore which contains mixed with the bauxite varying proportions of clay, which render the bauxite of low grade so that it will not fetch a sufficient price to warrant shipping the same for any considerable distances, and furthermore in many instances, this bauxite cannot be used as a source of aluminum compounds on account of its high content of clay (which is a silicate) and the object of the present invention is to separate the two ingredients of such low grade ores sufficiently to produce a high grade or moderately high grade bauxite. I have discovered that if the bauxite is ground up and either simultaneously or subsequently treated with an appropriate solution, it is possible to float off the bulk of the clay and clay-like substances leaving the bauxite in a purified condition, in which it is usable for many purposes for which the original low grade ore is not suitable.

The bauxite is reduced to grains, which quickly settle in the water and deflocculating media, without so sliming the bauxite as to render it liable to suspension with the clay.

As the solution in which to float off the clay, I find that various alkalis or alkaline earths can be used to advantage, the clay remaining in suspension in such materials readily, while the bauxite separates out from the solution almost immediately.

Accordingly, the process of the present invention is preferably carried out as follows:

The ore is delivered preferably continuously to a wet grinding mill and a solution of an alkali, preferably caustic soda, is also delivered preferably continuously to the same mill. The ore is ground or crushed in the presence of the alkali solution to pass a screen of about 20 meshes to the linear inch. The liquid slurry flowing away from the mill then passes to an elutriation tank or trough, the water with the suspended clay is continuously floated off at the top while the ore is continuously removed from the bottom by means of a suitable elevating or conveying device. The flow is proportioned to secure the most efficient separation and this will depend to a considerable extent on the cost of caustic alkali at the place where the operation is to be conducted (namely, at the quarry or pit where the ore is taken out), the relative proportions of clay and bauxite in the ore, value of bauxite and various other conditions. The strength of the caustic alkali also can be varied more or less, but for ordinary purposes, I find that a 0.02% solution gives satisfactory results, and that an amount of this solution equal to about 800 gallons can conveniently be used, per ton of ore under treatment.

The bauxite recovered from the elutriation tank may be washed with water to remove and recover adhering soda, the liquor containing the clay and caustic soda solution can be run into settling ponds or tanks, and after the bulk of the clay has settled, this liquor can be reused, being fortified if desired, by the addition of a further small quantity of alkali or the liquor can be limed to convert the carbonate back into caustic, then fortified with more caustic alkali and then reused. In such latter operation, the amount of lime about chemically equivalent to the quantity of sodium carbonate in the solution, or a little more than such amount, can conveniently be employed. It is well known that caustic soda absorbs carbon dioxid from the atmosphere readily forming sodium carbonate. In place of caustic soda, other caustic alkalis can be used and also lime water can be used. Lime water is not so efficient in the process, but possesses the advantage of greater cheapness. The wash water from the washing of the elutriated bauxite may be treated in a manner similar to the clay liquor for reuse. If desired the caustic soda solution can be thrown away after use.

I claim:

1. A separating process, consisting in subjecting clay contaminated bauxite ores to disintegration, and agitation, in a clay deflocculating liquid, until the clayey components are suspended, and then separately removing the suspended clay and the granular bauxite; the disintegration being regulated to retain bauxite in granular form.

2. A separating process consisting in subjecting clay contaminated bauxite ores to grinding and agitation in an alkaline liquid, until the clay particles are suspended and separately removing the suspended clay and the granular bauxite; the grinding being regulated to retain the bauxite in granular form.

EDGAR EVERHART.